United States Patent [19]

Saxton et al.

[11] Patent Number: 5,508,019
[45] Date of Patent: Apr. 16, 1996

[54] DEALUMINATION OF ALUMINOSILICATES

[75] Inventors: Robert J. Saxton, West Chester, Pa.;
Guy L. Crocco, Wilmington, Del.;
John G. Zajacek, Devon, Pa.

[73] Assignee: ARCO Chemical Technology, L.P., Greenville, Del.

[21] Appl. No.: 269,292

[22] Filed: Jun. 30, 1994

[51] Int. Cl.$^6$ .................................................. C01B 39/08
[52] U.S. Cl. .................. 423/714; 423/713; 423/DIG. 27; 502/85
[58] Field of Search ..................................... 423/700, 713, 423/714, DIG. 27; 502/85

[56] References Cited

U.S. PATENT DOCUMENTS

| | | | |
|---|---|---|---|
| 3,442,794 | 5/1969 | Van Helden et al. | 208/111 |
| 3,442,795 | 5/1969 | Kerr et al. | 208/120 |
| 3,506,400 | 4/1970 | Eberly, Jr. et al. | 423/713 |
| 3,597,155 | 8/1971 | Flanigen | 423/718 |
| 3,691,099 | 9/1972 | Young | 502/62 |
| 3,836,561 | 9/1974 | Young | 502/65 |
| 4,454,367 | 6/1984 | Sakurada et al. | 585/533 |
| 4,576,805 | 3/1986 | Chang et al. | 423/715 |
| 4,891,448 | 1/1990 | Garcis et al. | 568/628 |
| 5,004,841 | 4/1991 | Lee et al. | 568/628 |
| 5,026,941 | 6/1991 | Oguri et al. | 585/467 |
| 5,057,472 | 10/1991 | Hertzengerg et al. | 502/66 |
| 5,200,168 | 4/1993 | Apelian et al. | 423/714 |
| 5,204,076 | 4/1993 | Farnos et al. | 423/700 |
| 5,284,989 | 2/1994 | Apelian et al. | 585/533 |
| 5,288,922 | 2/1994 | Buske et al. | 568/635 |
| 5,310,534 | 5/1994 | Fajula et al. | 423/715 |
| 5,313,006 | 5/1994 | Knifton | 568/698 |
| 5,389,357 | 2/1995 | Sato et al. | 423/714 |

FOREIGN PATENT DOCUMENTS

| | | |
|---|---|---|
| 0095304 | 5/1983 | European Pat. Off. . |
| 0142313 | 11/1984 | European Pat. Off. . |
| 0575041 | 4/1993 | European Pat. Off. . |
| 2694549 | 8/1942 | France . |
| 56-125321 | 3/1980 | Japan . |
| 1061847 | 3/1967 | United Kingdom . |

OTHER PUBLICATIONS

*Catalysis Letters* 1 85–92 (1988) "A New Method for the Preparation of Titanium–Silicalite (TS–1)", by B. Karushaar & J. H. C. van Hooff 1988 No Month.

"The Preparation & Characterization of Aluminum–Deficient Zeolites" by J. Scherzer, pp. 157–200, *Catalytic Materials* 10 (1983) No Month.

"Single Step Dealumination of Zeolite Beta Producers for the Preparation of Hydrophobic Adsorbents", by Lami et al., pp. 237–245, *Microporous Matr.* 1 (1993) (No Month).

*Chemical Abstracts* 117: 114655, ("Preparation of High–Silicon Beta Zeolites"; CN 1,059,701) Abstract Only Mar. 1992.

*Primary Examiner*—Mark L. Bell
*Assistant Examiner*—David Sample
*Attorney, Agent, or Firm*—Stephen D. Harper

[57] ABSTRACT

Crystalline aluminosilicates such as zeolite beta may be readily dealuminated using organic sulfonic acids such as methanesulfonic acid to provide useful catalysts or catalyst precursors. A high degree of aluminum removal with minimal loss of crystallinity is possible even when an organic template is not present in the starting aluminosilicate.

15 Claims, No Drawings

DEALUMINATION OF ALUMINOSILICATES

FIELD OF THE INVENTION

This invention relates to methods whereby the aluminum present in the framework lattice of an aluminosilicate may be removed, either partially or essentially quantitatively, without significantly disturbing the crystallinity of the aluminosilicate. The dealuminated crystalline zeolites obtained by such methods are useful as catalysts and as intermediates for the preparation of transition metal-containing catalysts.

BACKGROUND OF THE INVENTION

Crystalline aluminosilicate zeolites, commonly referred to as "molecular sieves", are now well known in the art. They are characterized by their highly crystalline structure and uniformly dimensioned pores and are distinguishable from each other on the basis of composition, crystal structure, topology, absorption properties, surface area, pore volume, and the like. Zeolite materials, both natural and synthetic, have been demonstrated to have catalytic properties for various types of hydrocarbon conversion and chemical processing. It is often advantageous to dealuminate these materials in order to improve their process performance. Performance measures include product selectivity, product quality, and catalyst stability. Dealumination is also practiced in order to permit insertion of transition metals such as titanium into the lattice framework of the zeolite; the inserted metal thus takes the place of the aluminum which has been removed. Near quantitative aluminum removal is frequently desired, both to enable a high concentration of transition metal to be inserted and to avoid the deleterious effects that residual aluminum may cause. Aluminum sites in a zeolite framework, for example, often have a strongly acidic character and thus may catalyze undesired side reactions.

Conventional techniques for zeolite dealumination include hydrothermal treatment, mineral acid extraction, and chemical treatment with silicon tetrachloride or a chelating agent such as EDTA or a dicarboxylic acid. Such methods are reviewed in J. Scherzer, "The Preparation and Characterization of Aluminum-Deficient Zeolites", *Catalytic Materials,* Chapter 10, pp. 157–200 (1984). A listing of some of the patent art in this field may be found in U.S. Pat. No. 5,019,543. However, it is well known that such treatments are limited, in many cases, in the extent of dealumination by the onset of crystal degradation and loss of sorption capacity. One group of workers in the field has recently observed that "... the experimental conditions appear critical and must be systematically adjusted to the composition, structure, and/or texture of the parent material in order to preserve the integrity of the crystallinity" and that "complete removal of the framework aluminum requires repeated treatments" [Lami, et al., *Microporous Materials,* 1, 237–245(1993)]. According to U.S. Pat. No. 3,691,099, "the exposure of . . . aluminosilicates . . . to strongly acidic environment may produce undesirable changes in both physical structure and chemical composition by promoting loss of surface area, collapse of crystal structure or deactivation of acidic cation exchange sites."

Recently, in U.S. Pat. No. 5,310,534, a process for the dealuminization of large pore zeolites has been proposed involving leaching of the raw zeolite containing the structuring agent ("organic structurant") used to form the zeolite. The leaching, according to the patent, is accomplished through the use of "a strong organic acid" (formic acid, trichloroacetic acid, and trifluoroacetic acid being the only named organic acids) or "a strong inorganic acid". The patent stresses the need to have the structuring agent still present in the zeolite during acid leaching in order to preserve a high degree of crystallinity. The applicants submitted additional evidence during prosecution of the patent demonstrating that when nitric acid is used to treat a zeolite from which the structuring agent had first been removed, significant crystallinity losses result. The results of the examples described in European Pat. Publication No. 95,304 similarly suggest that treatment of such a zeolite with hydrochloric acid in an attempt to form beta zeolites having a high silica/alumina ratio also leads to reduced crystallinity.

It is apparent, therefore, that a process which would accomplish a high degree of dealumination using either protonated (calcined) zeolite or raw zeolite and a minimum number of treatment steps while preserving the crystallinity and ordered structure of the zeolite would be highly desirable.

SUMMARY OF THE INVENTION

This invention provides a method of removing framework aluminum from a crystalline aluminosilicate having a lattice framework comprised of silica and alumina, said method comprising contacting the crystalline aluminosilicate with an organic sulfonic acid to form a dealuminated crystalline zeolite.

In a particularly preferred embodiment, the method comprises contacting zeolite beta with from 1 to 500 parts by weight of a water soluble organic sulfonic acid per part of zeolite beta in an aqueous medium at a temperature of from 0° C. to 200° C. to form a dealuminated crystalline zeolite having an amount of framework aluminum at least 90% less than the amount of framework aluminum in the zeolite beta or, alternatively, a framework Si/Al ratio of at least 800. An important advantage of the invention is that near complete dealumination can be accomplished using a single treatment step. Unlike prior art dealumination methods using mineral acid, such as those described in U.S. Pat. No. 3,691,099, the presence of a water soluble salt or a structuring agent is not necessary for the retention of a high degree of crystallinity.

DETAILED DESCRIPTION OF THE INVENTION

The crystalline aluminosilicates which may be dealuminated in accordance with the present invention are those molecular sieve or zeolitic substances which can be described as having rigid three-dimensional networks of $SiO_4$ and $AlO_4$ tetrahedra in which the tetrahedra are cross-linked by the sharing of oxygen atoms whereby the ratio of the total aluminum and silica atoms to oxygen atoms is typically (in the absence of non-oxygen atoms other than Al and Si) 1:2. The electrovalence of the tetrahedra containing aluminum is balanced by the inclusion, in the crystal, of a cation such as a proton, alkali metal cation or alkaline earth metal cation.

Suitable crystalline aluminosilicates which may be treated in accordance with the present invention includes those materials which in their hydrated form can be represented by the following formula:

$$M_{2/n}O: Al_2O_3: wSiO_2:yH_2O$$

wherein M is a cation which balances the electrovalence of the tetrahedra, n represents the valence of the cation, w the number of moles of SiO$_2$ (silica), and y the number of moles of H$_2$O, the removal of which produces the open network system characteristic of molecular sieves. In preferred embodiments of this invention, the SiO$_2$ to Al$_2$O$_3$ molar ratio (i.e., the value of w) is at least 5:1. Such ratio in the starting aluminosilicate is typically less than 100; materials having higher ratios may also be successfully treated to remove aluminum, however. While any of the known naturally occurring or ;synthetically prepared aluminosilicates corresponding to the foregoing description may be satisfactorily utilized, including small pore, intermediate pore, and large pore zeolites, zeolite beta is particularly suitable for use. Zeolite beta is described in U.S. Pat. No. 3,308,069 (incorporated herein by reference in its entirety), Szostak,. *Handbook of Molecular Sieves* pp. 92–96, Higgin et al., *Zeolites*, 8, 446(1986), and Treacy et al., *Nature*, 332, 249 (1988) and is characterized by 12-member ring pore openings and a three dimensional interconnecting channel system. Other types of crystalline aluminosilicates may also be successfully dealuminated using the process of this invention including, for example, ZSM-5, ZSM-11, zeolite L, zeolite T, mordenite, erionite, faujasite, ZSM-20, ZSM-48, zeolite Y, ZSM-4, ZSM-12, ZSM-2.2, ZSM-23, ZSM-34, ZSM-35, ZSM-50, ZSM-18, ZSM-3, ZSM- 5/ZSM-11 intermediate, zeolite X, offretite, gmelnite, zeolite A, zeolite D, zeolite R, zeolite S, zeolite T, zeolite Z, zeolite E, zeolite F, zeolite O, zeolite B, zeolite Q, zeolite M, zeolite H, zeolite J, zeolite W, zeolite KG, zeolite omega, and the like. In one embodiment, the aluminosilicate has been treated by calcination or other method to remove any structuring agent present. The structuring agent (also referred to in the art as a "template") typically is a quaternary ammonium or phosphonium species, such as tetraethyl ammonium.

The crystalline aluminosilicate is treated with an organic sulfonic acid so as to remove framework aluminum. Without wishing to be bound by theory, it is believed that the organic sulfonic acid helps to convert the alumina present into a soluble species. The precise mechanism is not known. Apparently, however, organic sulfonic acids function in a manner different from that of other strong acids such as nitric acid and hydrochloric acid since it has now been found that such sulfonic acids are capable of achieving high Si/Al ratios with minimal loss of crystallinity even without structuring agent present in the starting aluminosilicate.

The organic sulfonic acid preferably has a pka of less than about 1 and may be any monomeric, oligomeric, or polymeric species having at least one —SO$_3$H group attached thereto. Suitable organic sulfonic acids include paraffin-based and alkane and cycloalkane sulfonic acids, unsaturated cyclic and arenesulfonic acids, heterocyclic sulfonic acids, and unsaturated straight and branched-chain sulfonic acids. In one embodiment of the invention, the organic sulfonic acid has the structure

wherein R is C$_1$–C$_{20}$ alkyl or C$_6$–C$_{20}$ aryl. Suitable C$_1$–C$_{20}$ alkyl groups include, for example, methyl, ethyl, propyl, butyl, pentyl, hexyl, cyclohexyl, and the like. The alkyl group may be straight chain, branched, or cyclic in structure and may advantageously be substituted with halogen (F,Cl, Br), nitro, cyano, phenyl, and the like. Illustrative C$_6$–C$_{20}$ aryl groups include phenyl, naphthyl, benzyl and substituted aryl groups such as those containing halogen, alkyl groups, nitro, cyano, and the like. Preferably, the aluminosilicate is contacted with the organic sulfonic acid in a liquid medium in which the acid and/or the aluminum species generated during dealumination is soluble but the aluminosilicate is insoluble. For example, where the liquid medium is an aqueous medium, the organic sulfonic acid may advantageously be a water-soluble species. Mixtures of acids may also be utilized.

Specific organic sulfonic acids appropriate for use in the process of the invention include, but are not limited to, methanesulfonic acid, ethanesulfonic acid, propanesulfonic acid, hexanesulfonic acid, benzenesulfonic acid, p-toluenesulfonic acid, trifluoromethane sulfonic acid, cyclohexanesulfonic acid, xylenesulfonic acid, 2-napthalenesulfonic acid, 1,3-benzenedisulfonic acid, organic sulfonic acid oligomers, trichloromethanesulfonic acid, m-nitrobenzenesulfonic acid, p-chlorobenzenesulfonic acid, 2,6-naphthalene disulfonic acid and the like and mixtures thereof. The optimum amount and concentration of the organic sulfonic acid relative to the quantity of crystalline aluminosilicate to be dealuminated will vary depending upon a number of factors, including, for example, the degree of dealumination desired, the aluminum content of the starting crystalline aluminosilicate, the quantity of solvent or other diluent (e.g., water) present, the pka of the organic sulfonic acid, as well as the temperature utilized for dealumination, but typically will be from about 1 to 500 parts (where the acid is methanesulfonic acid, more preferably from about 10 to 200) by weight per part by weight of the crystalline aluminosilicate. If the dealumination is performed in a liquid medium, the organic sulfonic acid concentration is desirably at least 0.5N (more preferably, at least 2N; most preferably, at least 5N if near quantitative Al removal is desired in a single treatment).

The temperature and time of contact between the acid and the aluminosilicate are not critical, but do affect the dealumination rate. Longer contact times and higher contact temperatures result in higher silica to alumina ratios (i.e., more complete dealumination). Preferred temperatures are in excess of about 20° C. preferably in excess of about 40° C. up to about 200°. Most preferred contact temperatures are in the range of from about 40° C. to 120° C. Contact pressures are typically atmospheric, although higher or lower pressures can be utilized. Contact times are preferably greater than about 0.1 hours, but more preferably are from 0.5 to 24 hours.

The process of this invention is capable of accomplishing near quantitative dealumination of a crystalline aluminosilicate through a single contact with the organic sulfonic acid. However, under some circumstances, it may be advantageous to perform said contacting in multiple stages. That is, an aluminosilicate may be partially dealuminated by contacting with one portion of organic sulfonic acid, then further dealuminated by treating with additional portions of acid. The contacting may be achieved by any appropriate means including, for example, suspending or slurrying the aluminosilicate in the organic sulfonic acid or a liquid medium containing the acid and then isolating the dealuminated zeolite by filtration, decantation, centrifugation, or other such means. Alternatively, the aluminosilicate may be maintained in a fixed bed or immobilized state while the acid is passed over it. If so desired, the acid may be recirculated through the aluminosilicate in this embodiment. The liquid medium may be comprised of water and/or an organic solvent (preferably, a relatively polar solvent such as an alcohol or acetonitrile; the solvent is preferably inert under the dealumination conditions). The effluent or filtrate obtained from the process, which generally will contain the leached aluminum as well as excess organic sulfonic acid, may be treated so as to recover, separate, or regenerate the organic sulfonic acid, which may thereafter be economically recycled for use in subsequent dealumination cycles. The effluent may alternatively be reused as is until such time as it is no longer capable of achieving the desired degree of aluminum removal.

Once the desired aluminum content is attained, the dealuminated zeolite may be washed with one or more portions of a suitable liquid medium such as water which is free of acid so as to remove residual organic sulfonic acid and/or non-framework aluminum. Drying and/or calcination may thereafter be performed as desired. Calcination at a temperature of from 300° C. to 750° C. may be used to remove any structuring: agent which may still be present. The dealuminated crystalline zeolites obtained by the process of this invention exhibit good thermal stability with little loss of crystallinity upon calcination.

The dealuminated zeolites produced by the process of this invention have substantially the same crystallographic structure as that of the initial aluminosilicate but with increased silica: alumina ratios. The silica: alumina ratio will generally, in a preferred embodiment, be at least 100:1, but may be 300:1, 500:1, 800:1 or even greater. Contrary to the expectation of the prior art, essentially quantitative aluminum removal is possible without significant degradation of crystallinity (e.g., at least 90% retention of crystallinity is typically attained).

The dealuminated zeolites produced by the present invention have utility as catalysts for a wide variety of organic conversion processes such as isomerization, dealkylation, alkylation, disproportionation, hydration of olefins, reaction of olefins with alcohols, hydrocarbon oxidation, dehydrogenation, dehydration of alcohols, desulfurization, hydrogenation, hydroforming, reforming, cracking, hydrocracking, oxidation, polymerization and aromatization. The dealuminated zeolites may be combined with any suitable binder or support (e.g., clay, alumina, silica) and formed into any desired shape (e.g., granules, spheres, extrudates) using conventional techniques. In one embodiment of the invention, the dealuminated zeolite is reacted with a suitable transition metal source so as to incorporate the transition metal. For example, titanium may be inserted into the lattice framework of dealuminated zeolite; the inserted titanium occupies at least a portion of the sites vacated by the removed alumina. Methods of incorporating metals such as titanium into dealuminated zeolites are well-known and are described, for example, in U.S. Pat. No. 4,576,805, U.S. Pat. 4,828,812 and Kranshaar et al., *Catal. Lett.* 1, 81–84(1988). The dealuminated zeolite may be contacted with a volatile transition metal compound such as titanium tetrachloride at elevated temperatures. Titanium-substituted zeolites prepared from dealuminated aluminosilicates (also referred to as titanium silicalites) have utility as catalysts for the epoxidation of olefins using hydrogen peroxide, as described in U.S. application Ser. Nos. 08/172,404 and 08/172,405, filed Dec. 23, 1993. Such materials are also useful as catalysts for the hydroxylation of aromatic compounds and the formation of oximes from ketones using hydrogen peroxide.

From the foregoing description, one skilled in the art can readily ascertain the essential characteristics of this invention, and, without depositing from the spirit and scope thereof, can make various changes and modifications of the invention to adapt it to various usages, conditions, and embodiments. All of these variations are considered to be encompassed by the present invention.

The following examples further illustrate the effectiveness and utility of the process of this invention.

EXAMPLES

Example 1

To 100 mL of deionized water was charged 2.0 g calcined zeolite beta (Si/Al=43.5; obtained from Conteka). To this room temperature suspension was added slowly with stirring 100 mL (144 g) of 99% methane sulfonic acid (obtained from Aldrich Chemical). After complete addition of the acid, the suspension was heated at 80° C. for four hours. After this time, the suspension was diluted three-fold with water, filtered, and the solids thus obtained washed thoroughly with water until the filtrate was neutral. The resultant dealuminated product was then dried at 110° C. overnight to yield 1.75g product. XRD characterization of the product showed the typical pattern of zeolite beta with 95% crystallinity and a slight shift to smaller d-spacings. The dealuminated product analyzed for about 500 ppm aluminum, confirming that the Si/Al ratio was successfully increased to greater than 850 without significant loss of crystallinity. This result was quite unexpected, in view of the teaching of the prior art that acid leaching of a calcined zeolite beta to remove substantially all of the aluminum present will destroy crystallinity.

Example 2

This example demonstrates that dealumination using recycled sulfonic acid solution can be accomplished using the process of this invention. To 50 g deionized water was added 1.01g zeolite beta (Si/Al=43.5). 50 mL (60 g) of 99% methanesulfonic acid were slowly added and the resultant suspension heated at 80° C. for four hours. The solids were then isolated by filtration. The filtrate was separated and the solids washed thoroughly with water and dried at 110° C. overnight. The separated filtrate was used for a subsequent dealumination under identical conditions as those described above with 1.0 g fresh zeolite. This procedure was repeated four times and the five separate dealuminated products analyzed for aluminum. The product from the fourth cycle analyzed for a Si/Al ratio of 1150 whereas the dealuminated zeolite from the fifth cycle had a Si/Al ratio of 240. In another variation on this procedure, fresh sulfonic acid could be added to the filtrate so as to replace any sulfonic acid consumed during dealumination and to increase the concentration of acid in the filtrate.

Example 3

Dealuminations using as-synthesized zeolites (i.e., non-calcined aluminosilicates still containing organic template) were performed using procedures similar to those described in Example 1. The crystallinities of the dealuminated products were >95% as compared to the parent materials.

Example 4

The procedure of Example 1 is repeated using benzenesulfonic acid (90% technical grade) instead of methanesulfonic acid.

Example 5

The procedure of Example 1 is repeated using mordenite (prepared in accordance with U.S. Pat. No. 4,052,472) instead of zeolite beta.

Example 6

The procedure of Example 1 is repeated using zeolite Y instead of zeolite beta.

Example 7

The procedure of Example 1 is repeated using ZSM-5 having a framework Si/Al ratio of 50 instead of the zeolite beta.

Example 8

The procedure of Example 1 is repeated using a first portion of 30 mL methanesulfonic acid. The solids isolated by filtration are then resuspended in a mixture of 100 mL water and 30 mL methanesulfonic acid and heated at 80° C. for four hours. The solids are again isolated by filtration and retreated in the same manner. After the third acid treatment, the filtered solids are washed with water and dried as in Example 1.

Example 9

The procedure of Example 1 is repeated, except that following the initial filtration the solids are leached again with acid in the same manner.

Example 10

The procedure of Example 1 is repeated using 25 mL trifluoromethanesulfonic acid instead of methanesulfonic acid.

Example 11

The procedure of Example 1 is repeated using 75 mL p-toluenesulfonic acid instead of methanesulfonic acid and a leaching temperature of 100° C.

We claim:

1. A method of removing framework aluminum from a zeolite beta, said method comprising contacting the zeolite beta with a water-soluble organic sulfonic acid, wherein the water-soluble organic sulfonic acid is present at a concentration of at least 2N in an aqueous medium, at a temperature of from 20° C. to 200° C. to form a dealuminated zeolite beta having a framework Si/Al ratio of at least 800 and a crystallinity of at least 90% relative to the crystallinity of the zeolite beta prior to said acid treatment.

2. The method of claim 1 wherein the water-soluble organic sulfonic acid is methanesulfonic acid.

3. The method of claim 1 wherein the water-soluble organic sulfonic acid is present at a concentration of at least 5N.

4. The method of claim 1 comprising an additional step of contacting the dealuminated zeolite beta with a titanium compound to form a titanium substituted zeolite beta.

5. The method of claim 1 wherein the zeolite beta is essentially free of a structuring agent.

6. The method of claim 1 wherein the water-soluble organic sulfonic acid has a $pk_a$ of less than 1.

7. The method of claim 1 wherein the water soluble organic sulfonic acid is selected from the group consisting of benzenesulfonic acid, methanesulfonic acid, p-toluenesulfonic acid, ethanesulfonic acid, trifluoromethane sulfonic acid, propanesulfonic acid, butanesulfonic acid, xylenesulfonic acid, trichloromethane sulfonic acid, and mixtures thereof.

8. The method of claim 1 comprising an additional step of separating the dealuminated zeolite beta from the aqueous medium.

9. The method of claim 8 comprising an additional step of washing the dealuminated zeolite beta with water.

10. The method of claim 9 comprising an additional step of drying the dealuminated zeolite beta after washing.

11. The method of claim 8 wherein the separated aqueous medium is recycled.

12. The method of claim 1 wherein said temperature is from 40° C. to 120° C.

13. The method of claim 1 wherein said contacting is performed in multiple stages.

14. The method of claim 1 wherein said contacting is performed in a single stage.

15. A method of removing framework aluminum from a zeolite beta, said method comprising contacting the zeolite beta with a water-soluble organic sulfonic acid having the structure $RSO_3H$ wherein R is $C_1$–$C_{20}$ alkyl or $C_6$–$C_{20}$ aryl, wherein the water soluble organic sulfonic acid is present at a concentration of at least 5N in an aqueous medium, at a temperature of 40° C. to 120° C. to form a dealuminated zeolite beta having a framework Si/Al ratio of at least 800 and a crystallinity of at least 90% relative to the crystallinity of the zeolite beta prior to said acid treatment.

* * * * *